United States Patent
Ponzio et al.

(10) Patent No.: US 10,749,418 B2
(45) Date of Patent: Aug. 18, 2020

(54) METHODS FOR FORMING WOVEN UNDULATED COIL ASSEMBLIES

(71) Applicant: ATOP S.p.A., Barberino val d'Elsa (IT)

(72) Inventors: Massimo Ponzio, Tavarnelle val di Pesa (IT); Rubino Corbinelli, Poggibonsi (IT)

(73) Assignee: ATOP S.P.A., Barberino val d'Elsa (IT)

( * ) Notice: Subject to any disclaimer, the term of this patent is extended or adjusted under 35 U.S.C. 154(b) by 220 days.

(21) Appl. No.: 15/570,735

(22) PCT Filed: Apr. 18, 2016

(86) PCT No.: PCT/IB2016/052200
§ 371 (c)(1),
(2) Date: Oct. 30, 2017

(87) PCT Pub. No.: WO2016/174542
PCT Pub. Date: Nov. 3, 2016

(65) Prior Publication Data
US 2018/0294700 A1    Oct. 11, 2018

(30) Foreign Application Priority Data

Apr. 30, 2015 (IT) ................. PI2015A0031
Apr. 30, 2015 (IT) ................. PI2015A0032
(Continued)

(51) Int. Cl.
*H01F 7/06* (2006.01)
*H02K 15/04* (2006.01)
(Continued)

(52) U.S. Cl.
CPC ......... *H02K 15/0478* (2013.01); *B21C 47/10* (2013.01); *H02K 3/12* (2013.01); *H02K 15/085* (2013.01); *Y10T 29/49071* (2015.01)

(58) Field of Classification Search
CPC ...... B21F 3/04; B21F 1/00; B21F 1/04; B21F 3/00; H02K 15/0478; H02K 15/026;
(Continued)

(56) References Cited

U.S. PATENT DOCUMENTS 2,476,744 A   7/1949  Leece
3,543,337 A   12/1970 Meyn
(Continued)

FOREIGN PATENT DOCUMENTS

DE    112011100868 T5   12/2012
EP     1 041 696 A1     10/2000
(Continued)

OTHER PUBLICATIONS

International Preliminary Report on Patentability dated Sep. 10, 2013 for International Application No. PCT/EP2012/000633.
(Continued)

*Primary Examiner* — Thiem D Phan
(74) *Attorney, Agent, or Firm* — Cooley LLP

(57) ABSTRACT

Methods and apparatuses for forming a woven coil assembly (100), the coil assembly having adjacent superimposed linear portions (L1-L6, AL7-AL12) extending parallel to each other in a first area (A1) of the coil assembly, and adjacent superimposed linear portions (L7-L12, AL13-AL18) extending parallel to each other in a second area (A2) of the coil assembly, wherein a plurality of head portions (T) connect the linear portions of the first area (A1) to the linear portions of the second area (A2).

7 Claims, 10 Drawing Sheets

(30) Foreign Application Priority Data

| Apr. 30, 2015 | (IT) | ................................ PI2015A0033 |
| Apr. 30, 2015 | (IT) | ................................ PI2015A0034 |

(51) Int. Cl.
*B21C 47/10* (2006.01)
*H02K 3/12* (2006.01)
*H02K 15/085* (2006.01)

(58) Field of Classification Search
CPC ............... B21D 11/06; Y10T 29/49902; Y10T 29/53122; Y10T 29/49071; Y10T 29/49073
USPC ......... 29/605, 596, 598, 602.1, 603.24, 606, 29/618
See application file for complete search history.

(56) References Cited

U.S. PATENT DOCUMENTS

| 3,631,591 A | 1/1972 | Eminger |
| 3,689,976 A | 9/1972 | Donovan |
| 4,052,783 A | 10/1977 | Shively |
| 4,727,742 A | 3/1988 | Weaver |
| 4,750,258 A | 6/1988 | Anderson |
| 4,901,433 A | 2/1990 | Barrera |
| 5,586,384 A | 12/1996 | Newman |
| 5,619,787 A | 4/1997 | Couture et al. |
| 6,140,735 A | 10/2000 | Kato et al. |
| 6,208,060 B1 | 3/2001 | Kusase et al. |
| 6,376,961 B2 * | 4/2002 | Murakami ............... H02K 3/14 310/179 |
| 6,389,678 B1 | 5/2002 | Ackermann et al. |
| 6,640,416 B1 | 11/2003 | Sadiku |
| 6,641,416 B2 | 11/2003 | Schulz et al. |
| 6,782,600 B2 | 8/2004 | Yamazaki et al. |
| 7,275,299 B2 | 10/2007 | Kuroyanagi et al. |
| 7,370,401 B2 | 5/2008 | Stratico et al. |
| 7,480,987 B1 | 1/2009 | Guercioni |
| 7,624,493 B2 * | 12/2009 | Hirota ................. H02K 15/0478 29/564.1 |
| 7,730,401 B2 | 6/2010 | Gillespie et al. |
| 7,941,910 B2 | 5/2011 | Guercioni |
| 8,215,000 B2 | 7/2012 | Guercioni |
| 8,296,926 B2 | 10/2012 | Wang et al. |
| 8,424,792 B2 | 4/2013 | Ponzio et al. |
| 8,555,694 B2 | 10/2013 | Saito et al. |
| 8,607,436 B2 | 12/2013 | Ponzio et al. |
| 8,826,513 B2 | 9/2014 | Guercioni |
| 8,918,986 B2 | 12/2014 | Guercioni |
| 8,922,078 B2 | 12/2014 | Guercioni |
| 9,300,193 B2 | 3/2016 | Guercioni |
| 9,455,614 B2 | 9/2016 | Corbinelli et al. |
| 9,467,029 B2 | 10/2016 | Ponzio et al. |
| 9,479,033 B2 | 10/2016 | Ponzio et al. |
| 9,520,762 B2 | 12/2016 | Guercioni |
| 9,692,283 B2 | 6/2017 | Ponzio et al. |
| 9,722,475 B2 | 8/2017 | Niccolini et al. |
| 9,755,487 B2 | 9/2017 | Ponzio et al. |
| 2001/0007169 A1 | 7/2001 | Takahashi et al. |
| 2002/0017585 A1 | 2/2002 | Haruta et al. |
| 2002/0053126 A1 | 5/2002 | Maeda et al. |
| 2002/0089250 A1 | 7/2002 | Naka et al. |
| 2003/0137207 A1 | 7/2003 | Tamura et al. |
| 2003/0159270 A1 | 8/2003 | Kato |
| 2003/0233748 A1 | 12/2003 | Gorohata et al. |
| 2004/0040142 A1 | 3/2004 | Hirota et al. |
| 2005/0236509 A1 | 10/2005 | Burch et al. |
| 2006/0001327 A1 | 1/2006 | Ossenkopp et al. |
| 2006/0022547 A1 | 2/2006 | Sadiku et al. |
| 2008/0148794 A1 | 6/2008 | Patterson et al. |
| 2009/0233748 A1 | 9/2009 | Boddy |
| 2009/0249853 A1 | 10/2009 | Young et al. |
| 2010/0325875 A1 | 12/2010 | Ponzio et al. |
| 2013/0162072 A1 | 6/2013 | Mizutani et al. |
| 2014/0196282 A1 | 7/2014 | Stephenson et al. |
| 2014/0300239 A1 | 10/2014 | Takizawa et al. |
| 2016/0254733 A1 | 9/2016 | Niccolini et al. |
| 2016/0365777 A1 | 12/2016 | Corginelli et al. |
| 2017/0012511 A1 | 1/2017 | Ponzio et al. |
| 2017/0302143 A1 | 10/2017 | Niccolini et al. |
| 2018/0233999 A1 | 8/2018 | Ponzio et al. |

FOREIGN PATENT DOCUMENTS

| EP | 1 041 702 A2 | 10/2000 |
| EP | 1 043 828 A2 | 10/2000 |
| EP | 1 061 635 A2 | 12/2000 |
| EP | 1 304 789 A1 | 4/2003 |
| EP | 1 324 463 A2 | 7/2003 |
| EP | 1 328 059 A2 | 7/2003 |
| EP | 1 372 242 A2 | 12/2003 |
| EP | 1 376 816 A2 | 1/2004 |
| EP | 1710896 A1 | 10/2006 |
| EP | 1 727 260 A2 | 11/2006 |
| EP | 1 043 828 B1 | 9/2009 |
| FR | 2 845 536 A1 | 4/2004 |
| FR | 2 896 351 A1 | 7/2007 |
| FR | 2968858 A1 | 6/2012 |
| GB | 6 447 61 | 10/1950 |
| GB | 1 496 445 | 12/1977 |
| WO | WO 2008/108317 A1 | 9/2008 |
| WO | WO 2011/004100 A2 | 1/2011 |
| WO | WO 2012/119691 A1 | 9/2012 |
| WO | WO 2012/156066 A2 | 11/2012 |
| WO | WO 2013/190860 A1 | 12/2013 |

OTHER PUBLICATIONS

International Preliminary Report on Patentability, dated Nov. 19, 2013, for International Application No. PCT/EP2012/002055.
International Search Report and Written Opinion dated Jan. 23, 2013 for International Application No. PCT/EP2012/0002055.
International Search Report and Written Opinion, dated Apr. 5, 2012, for International Application No. PCT/EP2012/000633.
International Search Report and Written Opinion, dated Jun. 19, 2015, for International Application No. PCT/EP2015/054254.
International Search Report and Written Opinion, dated May 4, 2015 for International Application No. PCT/EP2014/071226.
Search Report and Written Opinion completed Feb. 2, 2012 for IT TO2011A000435.
Search Report and Written Opinion completed Nov. 8, 2011 for IT TO2011A000199.
Search Report and Written Opinion, completed Jul. 28, 2014, for IT P120130092.
Search Report for Italian Application No. IT 201700036222, completed Dec. 20, 2017, with English claims translation.
International Search Report and Written Opinion for International Application No. PCT/IB2016/052200, dated Jul. 20, 2016.
Search Report for Italian Patent Application No. PI2015000031, date of completion Jan. 14, 2016.
Search Report for Italian Patent Application No. PI2015000032, date of completion Jan. 15, 2016.
Search Report for Italian Patent Application No. PI2015000033, date of completion Jan. 18, 2016.
Search Report for Italian Patent Application No. PI2015000034, date of completion Feb. 1, 2016.

* cited by examiner

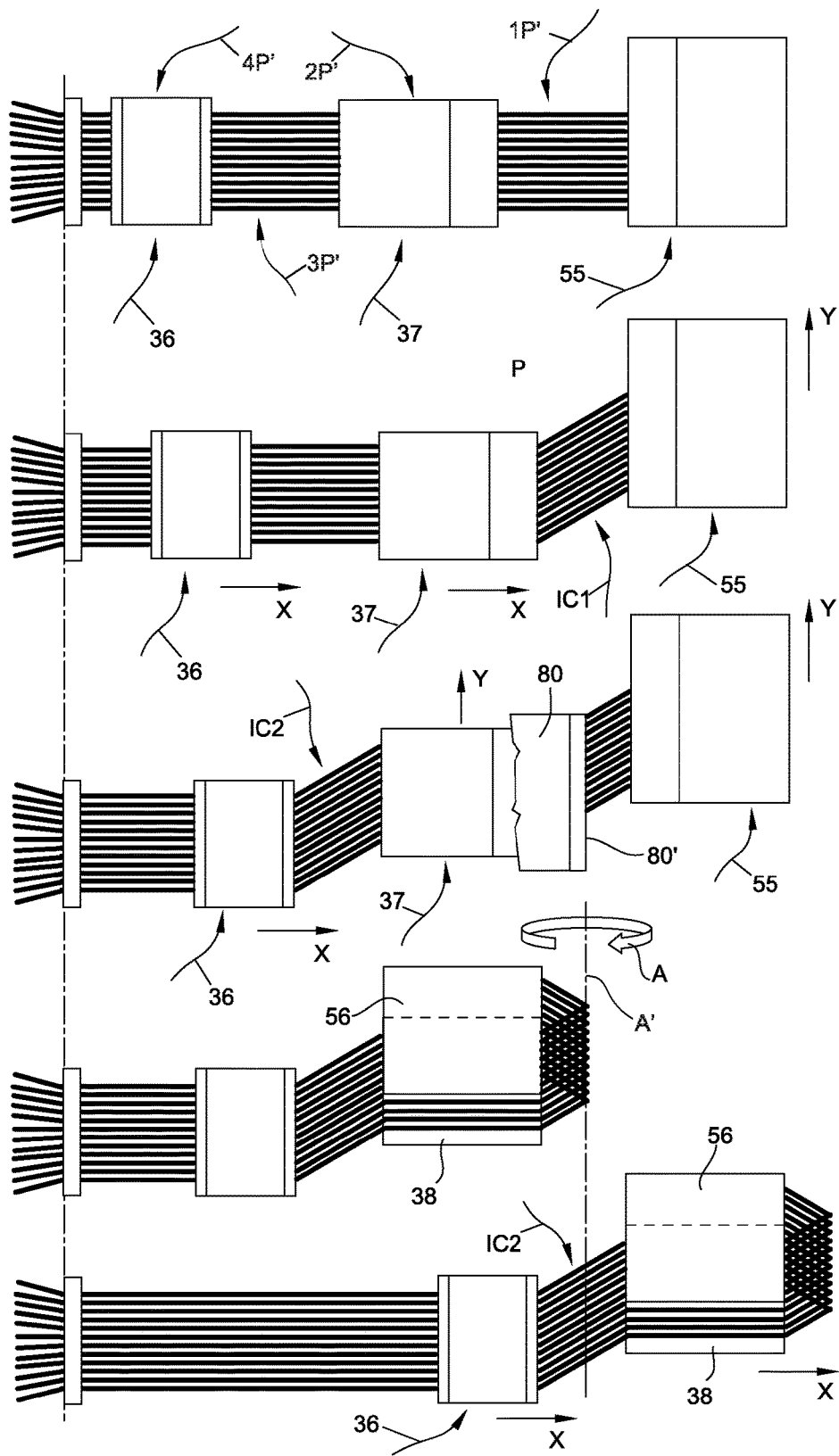

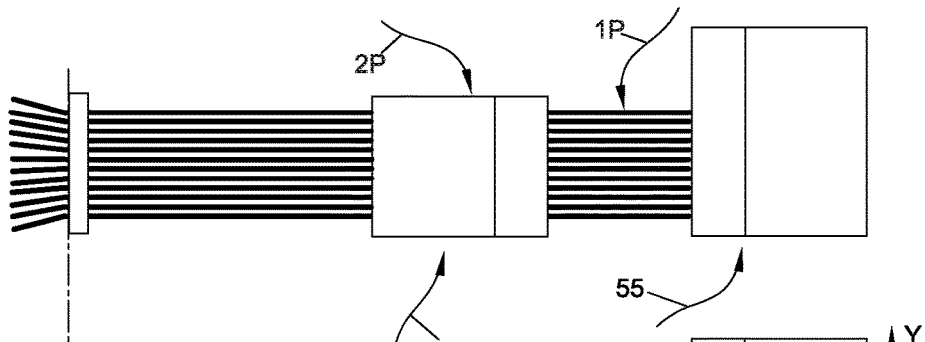
Fig. 16
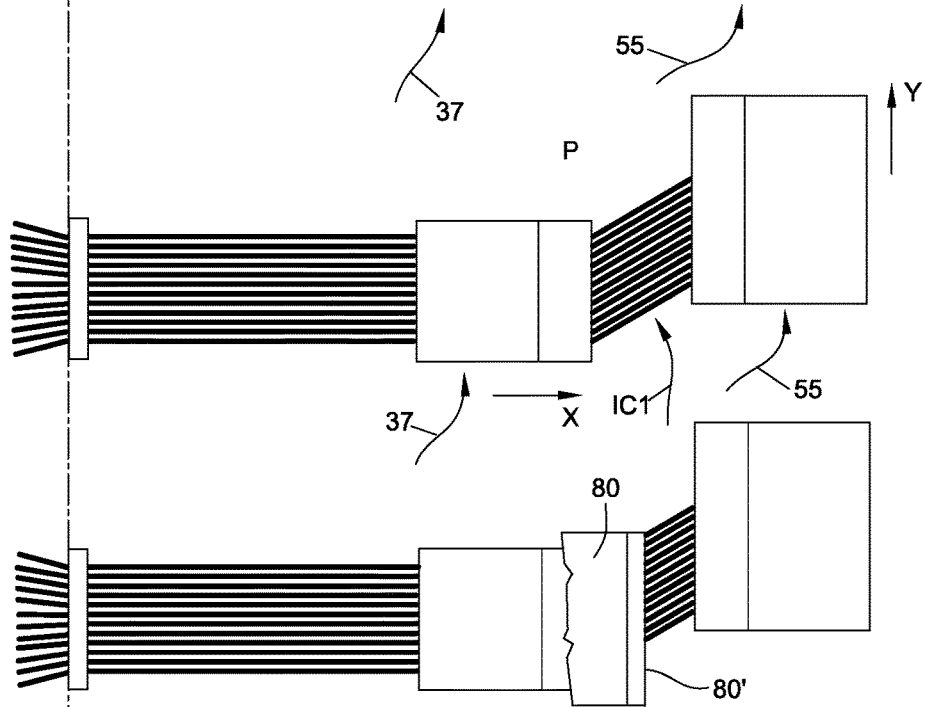
Fig. 17
Fig. 18
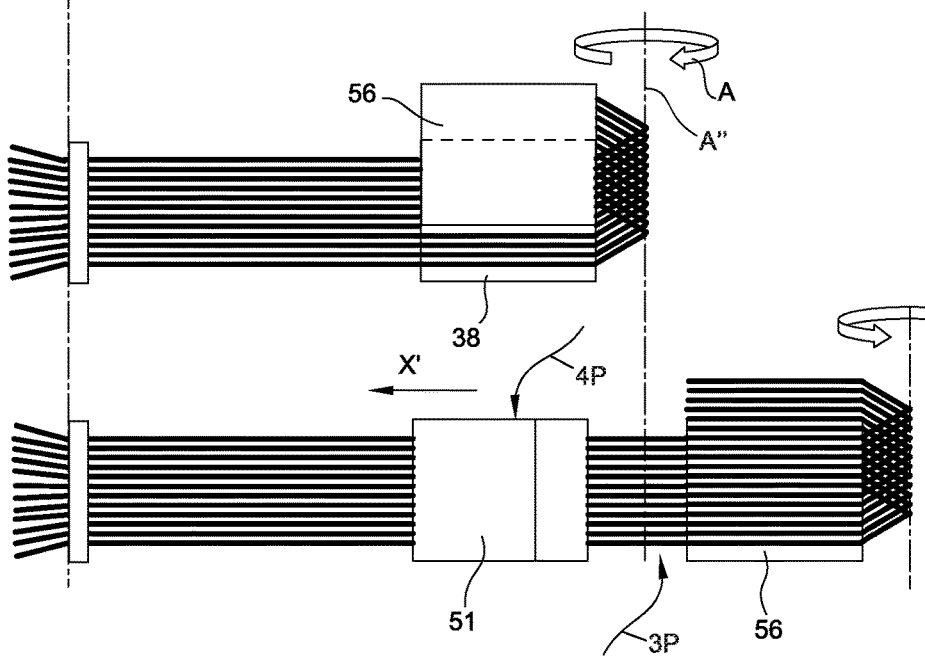
Fig. 19
Fig. 20

METHODS FOR FORMING WOVEN UNDULATED COIL ASSEMBLIES

CROSS-REFERENCE TO RELATED APPLICATIONS

This application is a PCT national stage application entitled to and hereby claiming priority under 35 U.S.C. 365 and 371 to corresponding PCT application no. PCT/IB2016/052200, filed Apr. 18, 2016, entitled "Methods and Apparatuses for Forming Woven Undulated Coil Assemblies", which in turn claims priority to Italian patent application nos. PI2015A000031, filed Apr. 30, 2015; PI2015A000032, filed Apr. 30, 2015; PI2015000033, filed Apr. 30, 2015 and PI2015A000034, filed Apr. 30, 2015. Each of the foregoing applications is incorporated herein by reference in its entirety.

FIELD OF THE INVENTION

The present invention relates to a method and apparatus for forming coil assemblies of a known type, like woven undulated coil assemblies.

STATE OF THE ART

As is known, an undulated coil has adjacent linear portions extending parallel to each other, and a plurality of turn portions for connecting the ends of adjacent linear portions to each other.

The linear portions are inserted in slots of a stator core, whilst the turn portions protrude from respective end sides of the stator core. The section of the conductor from which the coil is formed may be circular, square or rectangular. The size of the section of the conductor is usually comparable to the width of the section of the slot of the stator core. The conductors present in a slot are normally positioned one adjacent to another in a radial direction of the stator core, i.e. along an extension, which extends from a slot opening to the bottom of the same slot.

For reasons of clarity, a coil formed from one conductor having the undulated configuration will be referred to as "a coil", whilst a number of coils having the aforementioned configuration, and which are woven together, will be referred to as a coil assembly.

When examining the path of a conductor along the coil assembly which has been formed according to a woven configuration, the linear portions of one conductor are alternatively positioned above and below the linear portions of another conductor. This overlapping of a conductor is repeated at a pitch distance along the coil assembly and for a certain number of undulations. The turn portions joining these linear portions are positioned to be partially above and partially below turn portions of other coils.

Solutions for producing woven coil assemblies of undulated coils have been described in U.S. Pat. Nos. 8,122,593, 6,376,961, EP1710996 and U.S. Pat. No. 6,140,735.

Stator cores wound according to these principles can be used in dynamoelectric machines; in particular as components of traction motors and energy generators of vehicles.

The woven coil assembly can be first produced as a flat coil assembly, i.e. a planar coil assembly. Successively, the coil assembly can be transformed into a cylindrical form to insert the linear portions in the slots of the core, or the linear portions can be inserted directly into the slots of the core from the planar configurations. The turn portions protrude from the ends of the core after the linear portions have been inserted in the slots.

Normally, the coil assembly thickness can be reduced by applying compression on the flat coil assembly. Prior to the compression, the linear portions and turn portions need to be positioned with high precision in view of the low allowable tolerances that exist during the successive insertion operations in the core.

Furthermore, the production of woven coil assemblies has been mostly a manual operation, or a partially automatic using time consuming and complicated operations. Scarce success in these production attempts have been due to the high rate of inaccuracy in forming the coil assembly; particularly in forming the linear portions and the turns portions according to the tolerances required in their positioning.

SUMMARY OF THE INVENTION

It is therefore an object of the present invention to provide a method and an apparatus for manufacturing woven undulated coil assemblies, which overcome the drawbacks mentioned in the foregoing of the state of the art.

It is also an object of the present invention to provide a method and an apparatus for manufacturing woven undulated coil assemblies having linear portions and turn portions positioned with high precision.

It is a further scope of the invention to provide a method and an apparatus for manufacturing woven undulated coil assemblies with reduced production times with respect to the solutions of the state of the art.

It is another object of the present invention to provide a method and an apparatus for manufacturing woven undulated coil assemblies, which are highly flexible, in other words capable of manufacturing woven coils and conductors having different geometries.

It is a particular object of the present invention to provide a method and an apparatus for manufacturing woven undulated coil assemblies, which are completely automated.

These and other objects are achieved using the method and the apparatus for forming woven coils as described in the independent claims.

Other characteristics of the inventions are described in the dependent claims.

BRIEF DESCRIPTION OF THE DRAWINGS

The invention will be now shown with the following description of an exemplary embodiment, exemplifying but not limitative, with reference to the attached drawings in which:

FIGS. 6 to 14 are schematic views of various stages of functioning according to the principles of the invention as seen from a direction 6 of FIG. 3;

FIGS. 16 to 20 are views similar to those FIGS. 6-14, although illustrating various stages of functioning of the second embodiment of the invention.

DETAILED DESCRIPTION OF THE INVENTION

Figure 1:
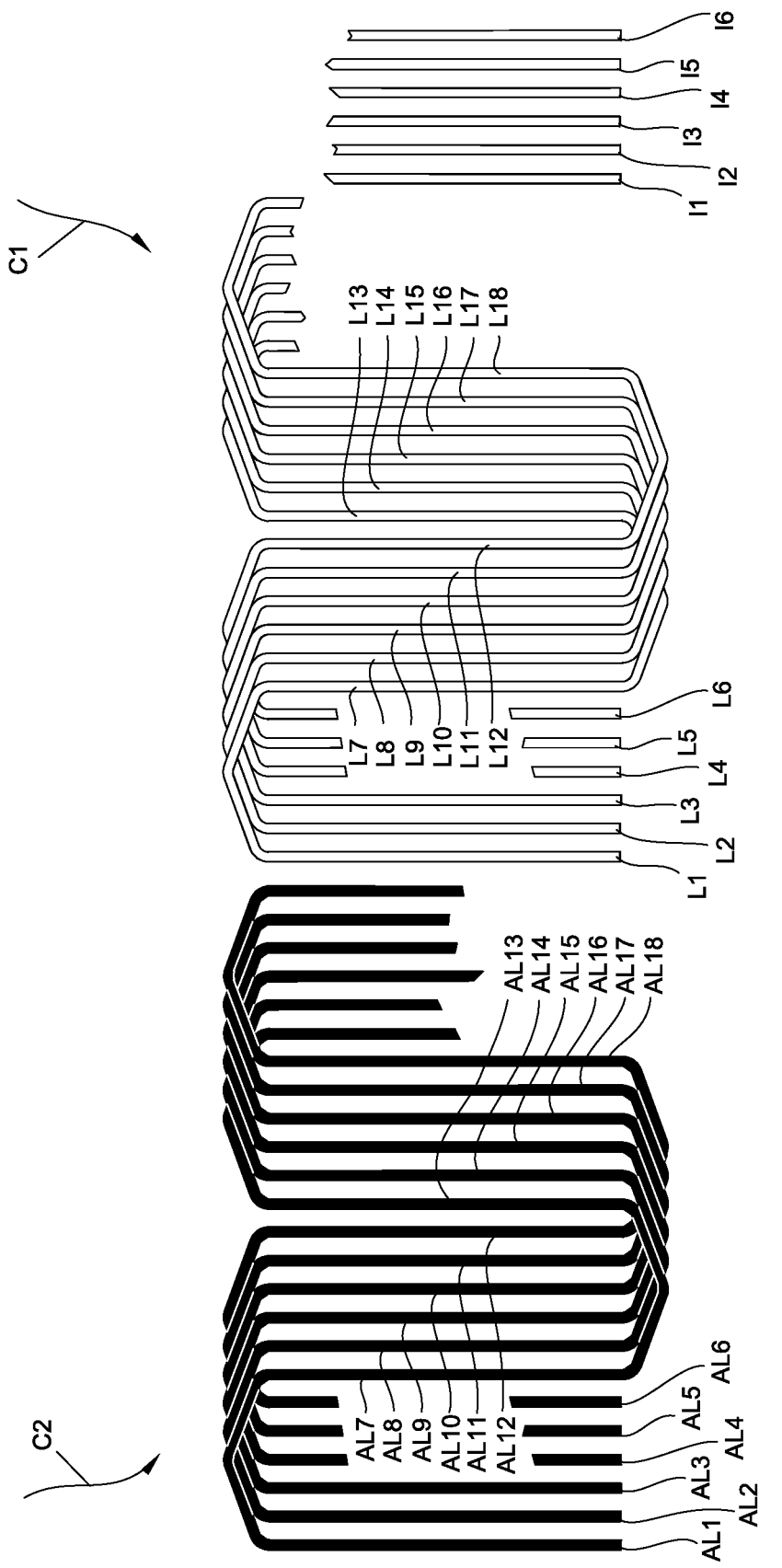
FIG. 1 is a schematic representation of portions of undulated coils.
Figure 2:
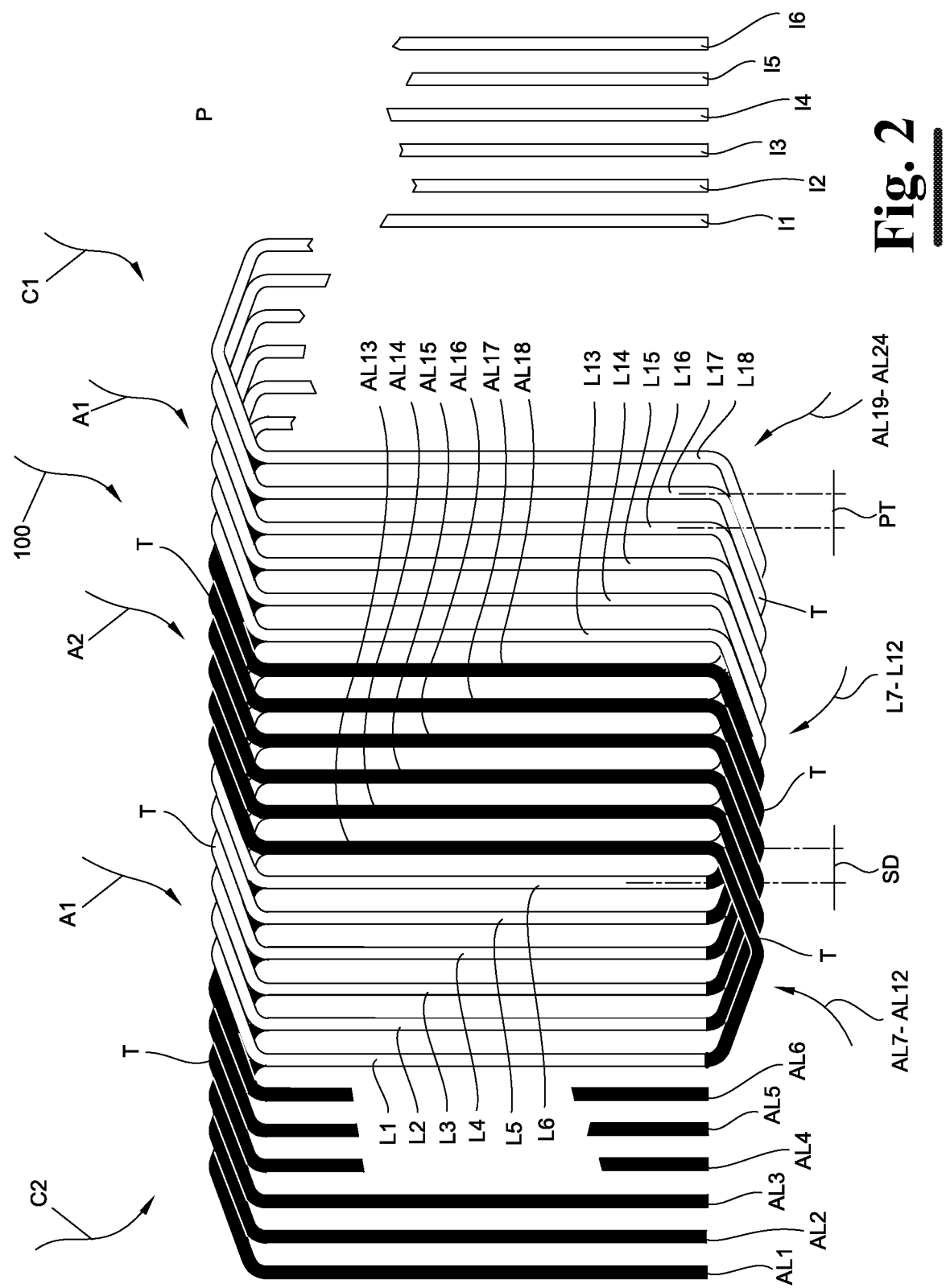
FIG. 2 is a schematic planar representation of a portion of a coil assembly formed according to the principles of the invention.

FIGS. 1 and 2 show the constitution of a woven coil assembly 100. FIG. 1 shows two separate undulated coil portions C1 and C2, which are used as a reference for explaining the woven coil assembly of FIG. 2.

A coil portion C1 is shown with dark shading, whilst a coil portion C2 is shown without shading. In this example, each of the coil portions C1 and C2 is formed of six wire conductors.

A portion of a formed woven coil assembly 100 consisting of twelve wire conductors is shown in FIG. 2. Coil assembly 100 has a flat configuration, which extends parallel to the plane P of the drawing of FIG. 2. The result of FIG. 2 can be considered an interlacing of the coil portions C1 and C2 of FIG. 1.

Considering more particularly the interlacing, in area A1 of coil assembly 100, six initial linear portions L1-L6 of coil portion C1 are overlapped, or in other words superimposed, on six linear portions AL7-AL12 of coil portion C2, therefore portions AL7-AL12 are not visible in FIG. 2.

The distance between two adjacent superimposed linear portions is referred to as the pitch (see PT in FIG. 2).

In area A2 of coil assembly 100, six linear portions AL13-AL18 of coil portion C2 are superimposed on six linear portions L7-L12 of coil portion C1, therefore linear portions L7-L12 are not visible in FIG. 2.

The transition between the various superimpositions occurs by means of turns T, which represent the turn portions of the coil assembly as shown in FIG. 2.

Adjacent turn portions T overlap each other with an orderly progression of succession. In fact, the overlap of the turn portions is such that it causes the linear portions of any of the conductors to pass between overlapping the linear portion of another conductor in area A1, to being overlapped by another linear portion of the same conductor in an adjacent area A2, as shown in FIG. 2.

This alternation of the linear portions being overlapped and then overlapping of the linear portions, with reference to one conductor, occurs constantly along the coil assembly for all the conductors, and represents the weaving or interlacing occurring.

In the example shown, the twelve conductors will have linear portions and turn portions positioned according to the alternation of overlapping described above.

According to the example of FIGS. 1 and 2, the linear portions of a specific conductor are positioned along the coil assembly at distances of 6 times the pitch distance, i.e. half the number of conductors multiplied by the pitch distance PT. Therefore as a general law, at a distances equal to half the number of conductor multiplied by the pitch distance.

Area A1 is adjacent to area A2 and the two areas are delimited by a separation distance SD equal to the pitch distance PT.

Areas A1 and A2 are repeated a predetermined number of times along the coil assembly 100. At the end of the last of the areas A1, or A2 of the flat coil assembly 100, the conductors form leads like AL1-AL6 respectively of coils C2, and initial leads I1-I6 of coils C1, which do not overlap as shown in FIG. 2.

However, when inserting the coil assembly 100 in the core of the stator, each of the leads I1-I6 of coil C1 can overlap a respective lead AL1-AL6 of coil C2 during their insertion in the slots of the stator core.

The core of the stator, which receives the coil assembly of FIG. 2, will have a number of slots proportional to the total number of linear portions that overlap. This total includes the linear portions of initial leads that overlap, as described previously. As a result, a slot of the stator core will have two linear portions that overlap accommodated on another two linear portions that overlap, and also on other linear portions that overlap, depending on the number of areas like A1 and A2, which have been foreseen in the coil assembly.

Figures 3, 3A, 3B:
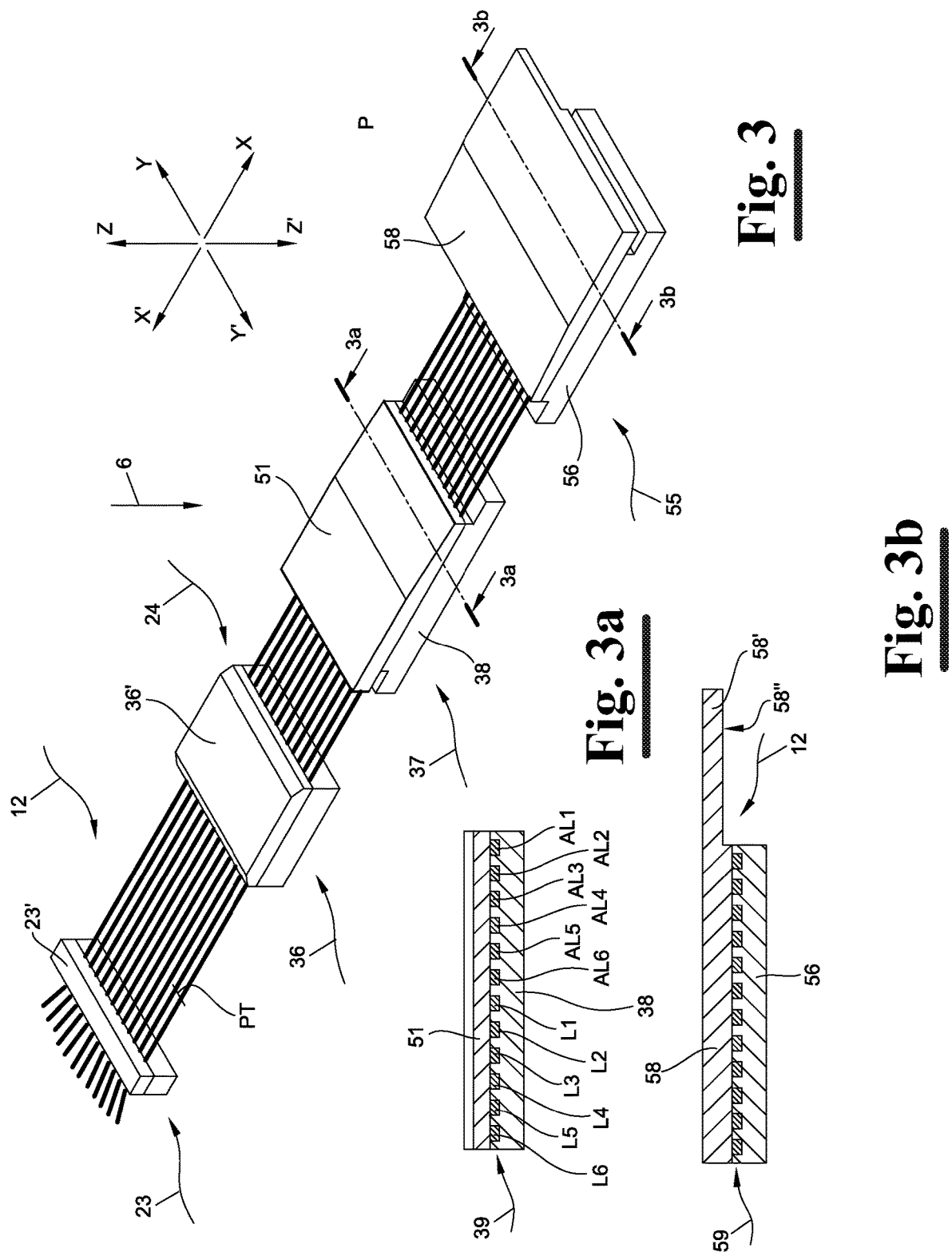
FIG. 3 is a schematic perspective view illustrating devices required for forming a coil assembly according to the invention.
FIG. 3a is a section view as seen from directions 3a-3a of FIG. 3.
FIG. 3b is a section view as seen from directions 3b-3b of FIG. 3.

With reference to FIG. 3, a first embodiment is shown for forming the example of a coil assembly of FIG. 2. More particularly, the example foresees twelve wire conductors of conductor group 12 fed through respective exits 23' of conductor supply store 23. Each conductor of the group of conductors 12 can be fed from a respective conductor supply reel (not shown) to exits 23'. Furthermore, along direction X, each of the wire conductors of group 12 passes through a respective seat of group of seats 24 of guide unit 36, as shown in FIG. 3. The seats of group 24 are twelve, each being aligned with a seat of conductor store exits 23. Therefore, the number of seats of group 24 is equal to the number of conductors of group 12.

The seats of group 24 are parallel to each other to cause conductors of group 12 to remain parallel to each other and to be separate from each other by a same pitch distance PT.

Feeding the conductors of group 12 in direction X can be seen as being a feeding of the conductors in direction X in a same plane P, which contains the twelve conductors. Orthogonal directions to X will be the Y direction, and the Z direction, as shown in FIG. 3. Directions X', Y' and Z' are directions opposite to directions X, Y, Z, respectively.

A first unit or holding device 37 is located down stream of guide unit 36 in the feeding direction X of the conductors. First holding unit 37 is provided with a first plate 38, or support member, having group of seats 39 which are open towards a second plate 51, or cover member. The second plate 51 covers the first plate 38 (see also FIG. 3a).

The seats of group 39 are twelve and are aligned with those of guide unit 36. Furthermore, the seats of group 39 are parallel to each other, and have the same separation pitch PT. First holding unit 37 is located so that seats of group 39 are aligned with seats of group 24 in order to achieve a travel of conductors of group 12 through the seats of guide unit 36 and first holding unit 37 without bending conductors of group 12.

A second device or holding unit 55 is located down stream of first holding unit 37 in the feeding direction X of the conductors. Second holding unit 55 is provided with a first plate 56, or support member, having group of seats 59, which are open towards a second plate 58, or cover member which covers the first plate 56 (see also FIG. 3b).

Seats of group 59 are parallel to each other and aligned with the same separation distance PT described in the foregoing for the seats of group 24 of guide unit 36.

Second holding unit 55 is located so that seats of group 59 are aligned with seats of group 39 of first holding unit 37 in order to achieve a travel of conductors of group 12 through the seats of first holding unit 37 and second holding unit 55 without bending conductors of group 12.

First plate 38 and second plate 51 of first holding unit 37 are assembled together to allow passage of the conductors in directions X and X' through seats of group 39 and without causing unwanted movements in transverse directions Y and Y' and Z and Z', and also for locking the conductors in directions X and X' when required.

First plate 56 and second plate 58 of second holding unit 55 are assembled together to allow passage of the conductors in the feeding direction X to reach the ends of seats of group 59 without causing unwanted movements in directions Y and Y' and Z and Z', and also for locking the conductors in directions X and X' once the conductors have reached a required position at the ends of the seats of group 59.

The resulting situation of conductors of group 12 which have been fed through guide unit 36, first holding unit 37, and second holding unit 55 is shown in FIG. 3.

A clamp device, not shown, can place the conductors on the paths and in the groups of seats described with reference to FIG. 3. The clamp is able to hold the ends of the conductors at the pitch distance PT. The clamp device moves in direction X to pull the conductors from the supply store 23. When the clamp device moves in direction X, a conductor is aligned with a specific seat of plate 36', plate 38 and plate 56. During this movement, plate 36", plate 51 and plate 58 have been removed to allow the conductors to access the seats when the clamp is moved in direction Z'. Once the conductors are located in the seats, plate 36", plate 51 and plate 58 can be relocated, as shown in FIG. 3.

FIG. 3a shows the section view of first holding unit 37 having group of seats 39 of first plate 38, where in each seat a conductor of group of conductors 12 is located. Second plate 51 covers the first plate 38. The underside of plate 51 can be in engagement with a predetermined pressure on the conductors to exert a clamping action when holding is required. If the conductors need to move though the seats, then the pressure can be reduced.

FIG. 3b shows the section view of second holding unit 55 having first plate 56 with group of seats 59, where a conductor is located in each seat, as shown. Similarly, second plate 58 covers the first plate 56. The underside of plate 58 can be in engagement with a predetermined pressure on the conductors to exert a clamping action when holding is required. If the conductors need to move though the seats, then the pressure can be reduced.

Second plate 58 is provided with extension 58'. The width W of the extension is such that the underside 58" of the extension 58' can cover and engage half the number of conductors (six conductors in the case of the example) of group of conductors 12, at a certain stage of the forming of the coil assembly.

FIGS. 6-14 are planar representations parallel to plane P showing a sequence of steps for forming the woven coil assembly of FIG. 2 starting from the condition of FIG. 3.

FIG. 6 shows the situation of FIG. 3

A successive step of the coil forming solution is shown in FIG. 7, where second holding unit 55 has moved in directions Y of plane P to cause conductors of group 12 to become inclined between second holding unit 55 and first holding unit 37. In particular, during the movement of the second holding unit 55 a first portion 1P' of conductors 12 (see FIG. 6) is bent.

For the example shown, the distance of the movement in direction Y is equal to six times the pitch PT. During the movement of second holding unit 55 in direction Y, guide unit 36 and first holding unit 37 can be moved in direction X to avoid excessive strain on the conductors of group 12.

This step of FIG. 7 results in the formation of the inclined portion IC1 of portion 1P' of conductors of group located between second holding unit 55 and first holding unit 37.

Figure 4:
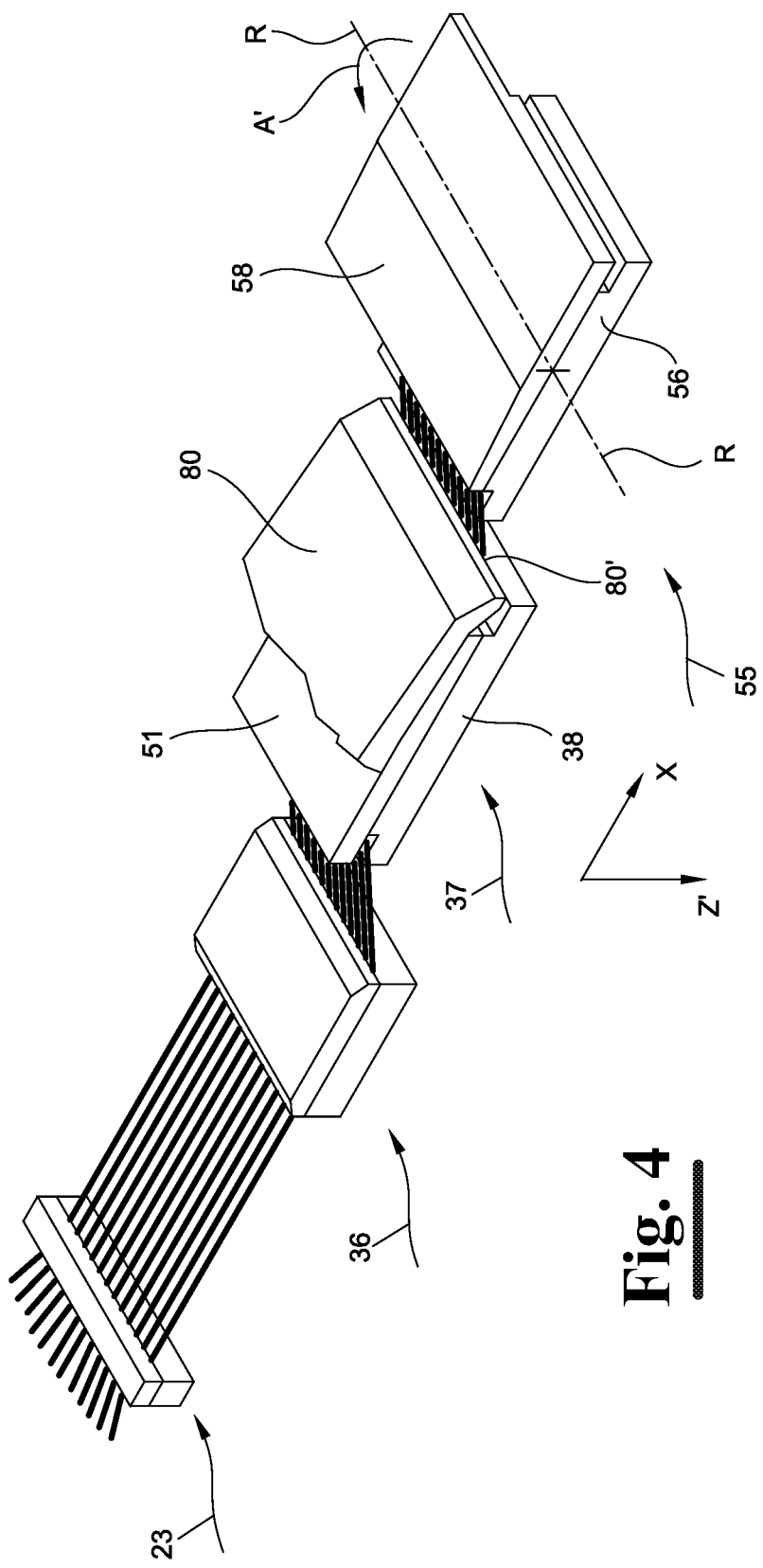
FIG. 4 is a schematic perspective view similar to the view of FIG. 3 illustrating devices required for forming a coil assembly according to the invention in a certain stage of functioning.

A successive step of the coil forming solution is shown in FIG. 4 and FIG. 8, where second holding unit 55 has moved further in directions Y of plane P, and at the same time first holding unit 37, which is holding a second portion of conductors 2P', is moved in direction Y for the same distance. This distance is equal to six times the pitch PT. The further movement in direction Y causes conductors of group 12 to become inclined between first holding unit 37 and guide unit 36, i.e. of a third portion of conductors 3P', thereby forming second inclined portion IC2 as shown in FIG. 8. Guide unit 36, which is positioned upstream of portion 3P', positions a fourth portion 4P'. Guide unit 36 is moved in direction X to avoid straining the conductors of group 12, when second holding unit 55 and first holding unit 37 are moved in direction Y.

In addition, as shown in FIG. 4 and FIG. 8, a bending plate 80 is positioned between first holding unit 37 and second holding unit 55. Preferably, bending plate 80 is located proximate to second plate 51 of first holding unit 37, with bending edge 80' positioned transverse and perpendicular to feeding direction X, as shown in FIGS. 4 and 8.

More particularly, bending edge 80' can be in engagement with the inclined portion IC1 of conductors of group 12 located between first holding unit 37 and second holding unit 55. Preferably, the engagement can occur approximately at the middle of the inclined portion IC1, as shown in FIGS. 4 and 8.

The next stage of the coil forming solution is shown in FIG. 9, where plate 56 of second holding unit 55 has been rotated according to arrow A around bending edge 80'. Bending edge 80' is aligned with axis A' and orthogonal to the feeding direction X. Prior to the rotation, in this stage around axis A', plates 51 and 58 are respectively removed from the first holding unit 37 and the second holding unit 55. Possible solutions for rotations around bending edge 80' can be either that plate 56 is rotated itself around bending edge 80', or that plate 56 is rotated around a middle axis R-R of second holding unit (see FIG. 4) for rotation A, and at the same time plate 38 moves in direction X and direction Z'. This second combination of motions achieves that bending edge 80' remains in engagement with the middle of the inclined portion IC1 during the rotation A around the middle axis R-R of plate 56.

This combination of motions results in a rotation around the bending edge 80'.

Figure 5:
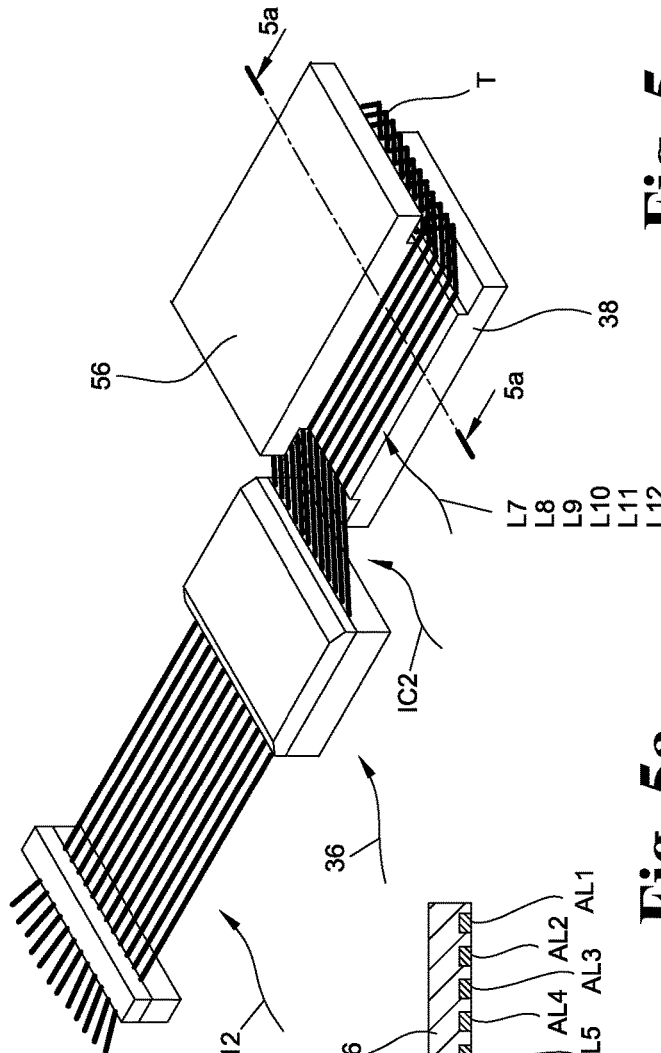
FIG. 5 is a schematic perspective view similar to the view of FIG. 3 illustrating devices required for forming a coil assembly according to the invention in a further stage of functioning.

At a predetermined position of the rotation around bending edge 80', bending plate 80 is removed to allow plate 56 to become close to plate 38, and at the same time to be located over plate 38, as shown in FIGS. 5 and FIG. 9.

Figure 5A:
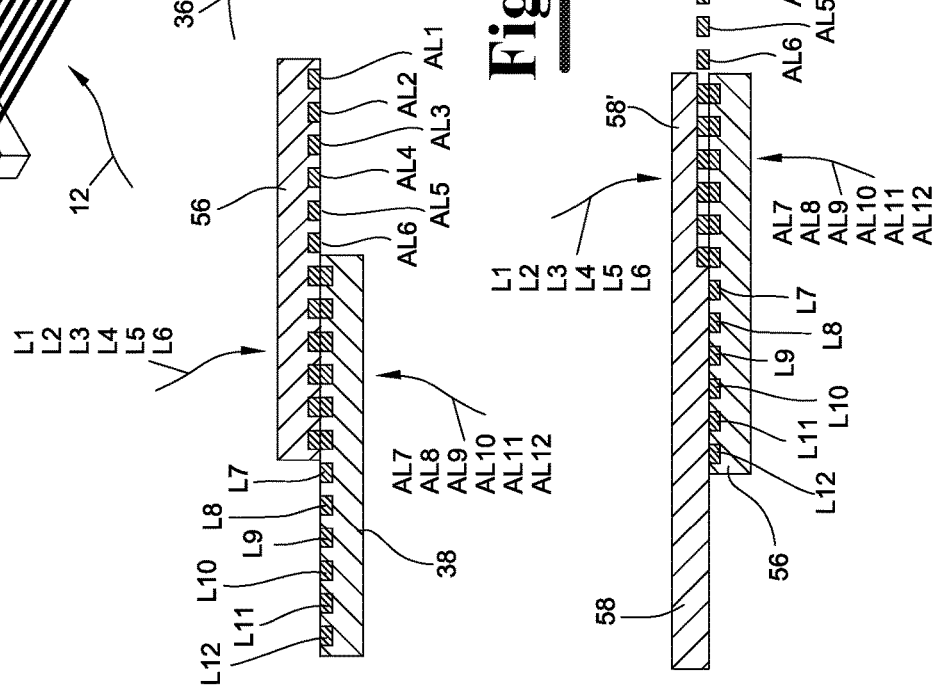
FIG. 5a is a view as seen from directions 5a-5a of FIG. 5.

With reference to FIGS. 1, 2 and 5a, the resulting situation is that leads AL1-AL6 of the coil assembly have been formed together with area A1 consisting of linear portions L1-L6 overlapping linear portions AL7-AL12, and also linear portions L7-L12. This result is visible in FIGS. 5 and 5a, where linear portions L7-L12 remain uncovered and positioned on one side of plate 56.

Successively, as shown in FIG. 10, guide unit 36 and overlapping plates 56 and 38 can be moved in direction X simultaneously and for same amounts to draw further lengths of conductors of group 12 from their respective wire conductor supply stores. This also obtains that inclined portion IC2 becomes aligned with the position where bending plate 80 is applied, as shown in FIG. 8.

Figure 11:
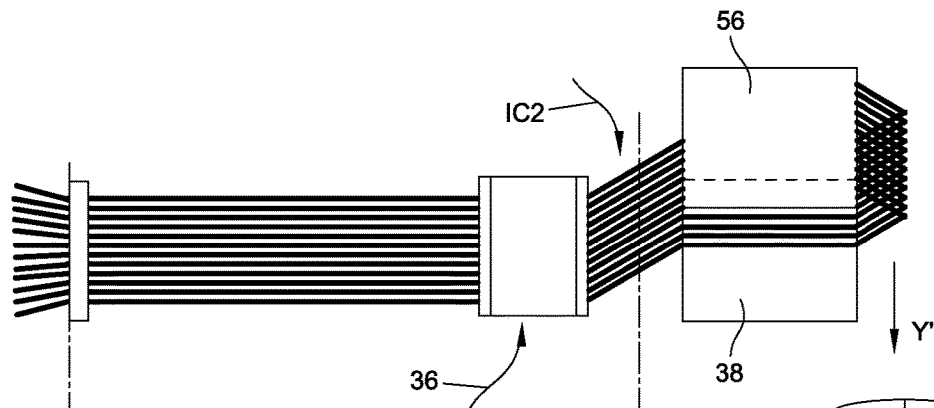

In FIG. 11, plate 38 has been moved in direction Z' to become free from the conductors and has been translated in direction Y' to return to the position in alignment with guide unit 36. In this way plate 38 can return to form first holding unit 37 with plate 51 repositioned as shown in FIG. 12.

Figure 12:
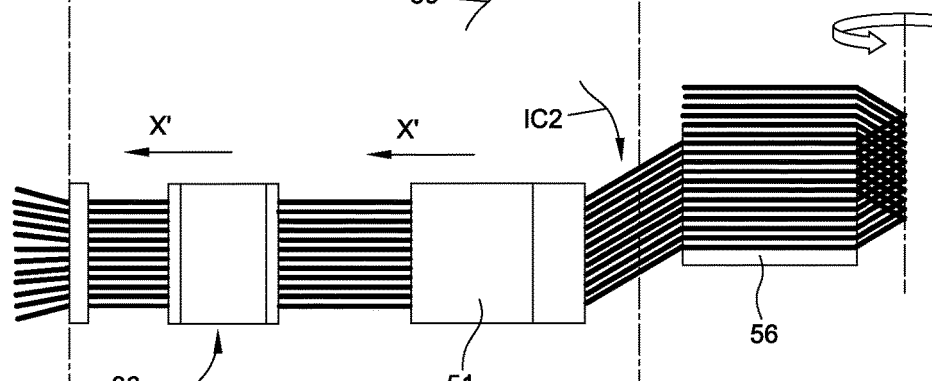

In FIG. 12, guide unit 36 and first holding unit 37 have been moved in direction X' along the conductors of group 12 to reach the position of FIG. 7.

Also with reference to FIG. 12, plate 56 has been rotated with rotation B to pass from being above the portion of formed coil assembly to being below as shown. In addition, plate 56 has been moved in direction Y' for 6 pitch distances to the original alignment position of FIG. 7.

When plate 56 is below the coil assembly and in alignment with the linear portions as shown in FIG. 12, plate 56 can be moved in direction Z to receive the aligned linear portions of the coil assembly.

Figure 5B:
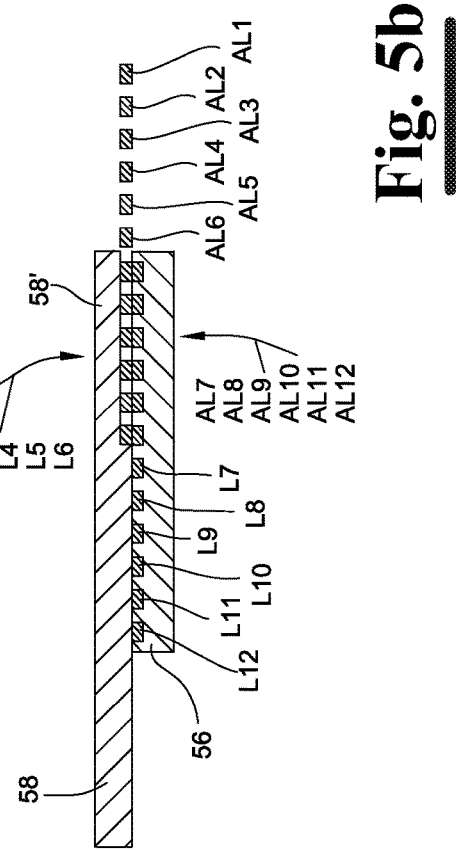
FIG. 5b is a view similar to that of FIG. 3b in a different stage of functioning.
Figure 13:
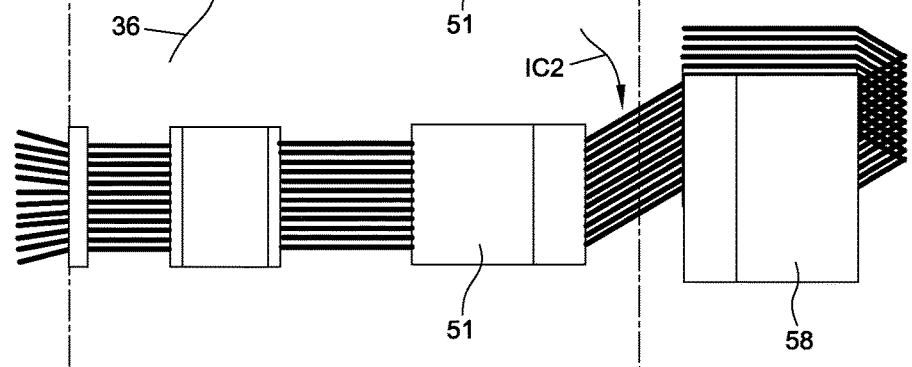

More particularly, with reference to FIGS. 12, 13 and 5b, plate 56 has moved in direction Z to receive area A1 consisting of linear portions AL7-AL12, overlapped by linear portions L1-L6, and linear portions L7-L12, whilst leads AL1-AL6 of the coil assembly extend beyond plate 56.

In a comparison between FIG. 5a and FIG. 5b, it is to be noted that in FIG. 5b there has been a displacement of plate 56 in direction Y' for 6 pitch distances.

FIGS. 13 and 5b show that plate 58 has been repositioned over plate 56 and that the resulting situation can be a successive start condition similar to that of FIG. 7.

A following series of stages like those of FIGS. 8-12 can be accomplished to continue forming the coil assembly. The end result will be that of FIG. 14, where bending has occurred once again around bending edge 80' for second inclined portion IC2.

Figure 14:
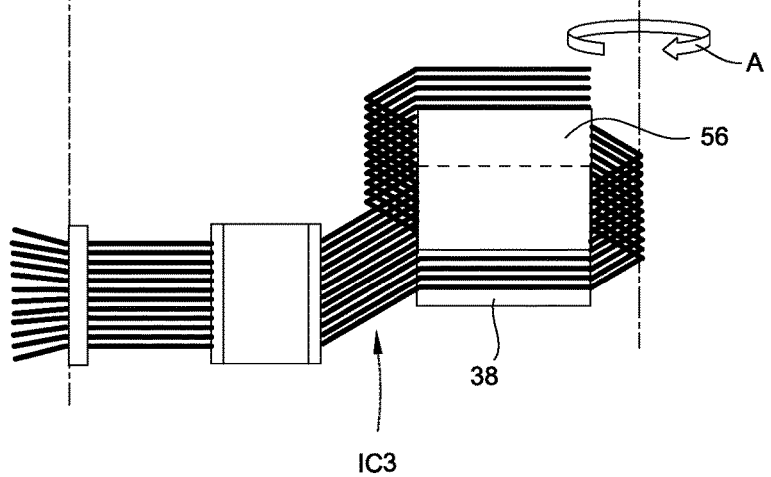

FIG. 14 is a situation like that of FIG. 9, although with a further portion of the coil assembly that has been formed.

In fact, in the situation of FIG. 14 and with reference to FIG. 2, linear portions AL13-AL18 overlap linear portions L7-L12 to form area A2 and linear portions L13-L18 will be seated in seats of plate 38 without being overlapped.

Linear portions L13-L18 will later be overlapped by linear portions AL19-AL24 as a result of rotating with the bending edge 80' engaged against inclined portion IC3.

It will be appreciated that the coil assembly can be completed by creating further inclined portions like IC1, IC2, IC3 and rotating against bending edge 80', like has been described in the foregoing sequence.

Figure 15:
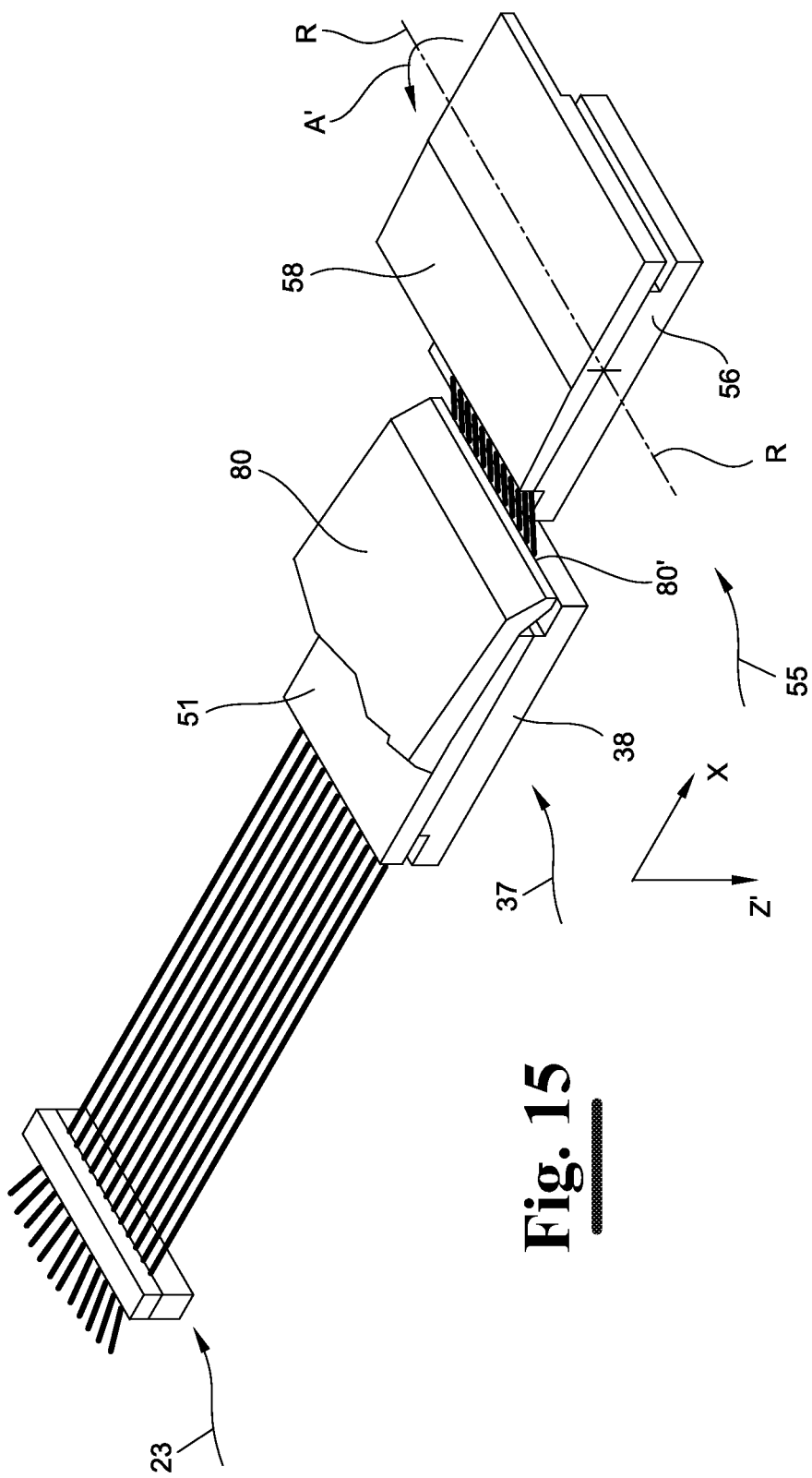
FIG. 15 is a view similar to FIG. 4, although illustrating a second embodiment of the invention.

A second embodiment of the invention for forming the coil assembly of FIG. 2 is shown in FIG. 15, where group of conductors 12 reach first holding unit 37 without passing through a guide unit like 36. In the second embodiment, second holding unit 55 is present and has functions similar to those of the second holding unit 55 of the first embodiment.

FIGS. 16-20 are stages similar those of FIGS. 6, 7 and 9 to form the result of the coil assembly which has been described with reference to FIG. 9.

In the second embodiment a second inclined portion has not been formed prior to bending the first inclined portion IC1 around bending edge 80', like has been described previously for the first embodiment with reference to FIG. 8.

In particular, in this embodiment, during bending of portion 1P of conductors 12 which forms the inclined portion IC1, the portion 2P, which is upstream along the feeding direction X, is positioned and being held in the holding device 37. As shown schematically in FIG. 19, the rotation of the portion of the first portion 1P occurs around an axis A" placed substantially in the middle of the first portion 1P, and perpendicular to the feeding direction X.

Successively, there is feeding of the conductors in the feeding direction X, which achieves a third portion 3P of the conductors positioned between the holding device 37 and the plate 56 (FIG. 20).

In particular, the third portion 3P of the conductors is located downstream of a fourth portion 4P of the conductors, positioned in the holding device 37 in FIG. 20. The third portion is thus bent and the bent portion is successively rotated around axis A", which obtains a rotated portion of conductors oriented in a direction opposite to the feed direction X.

Figure 21:
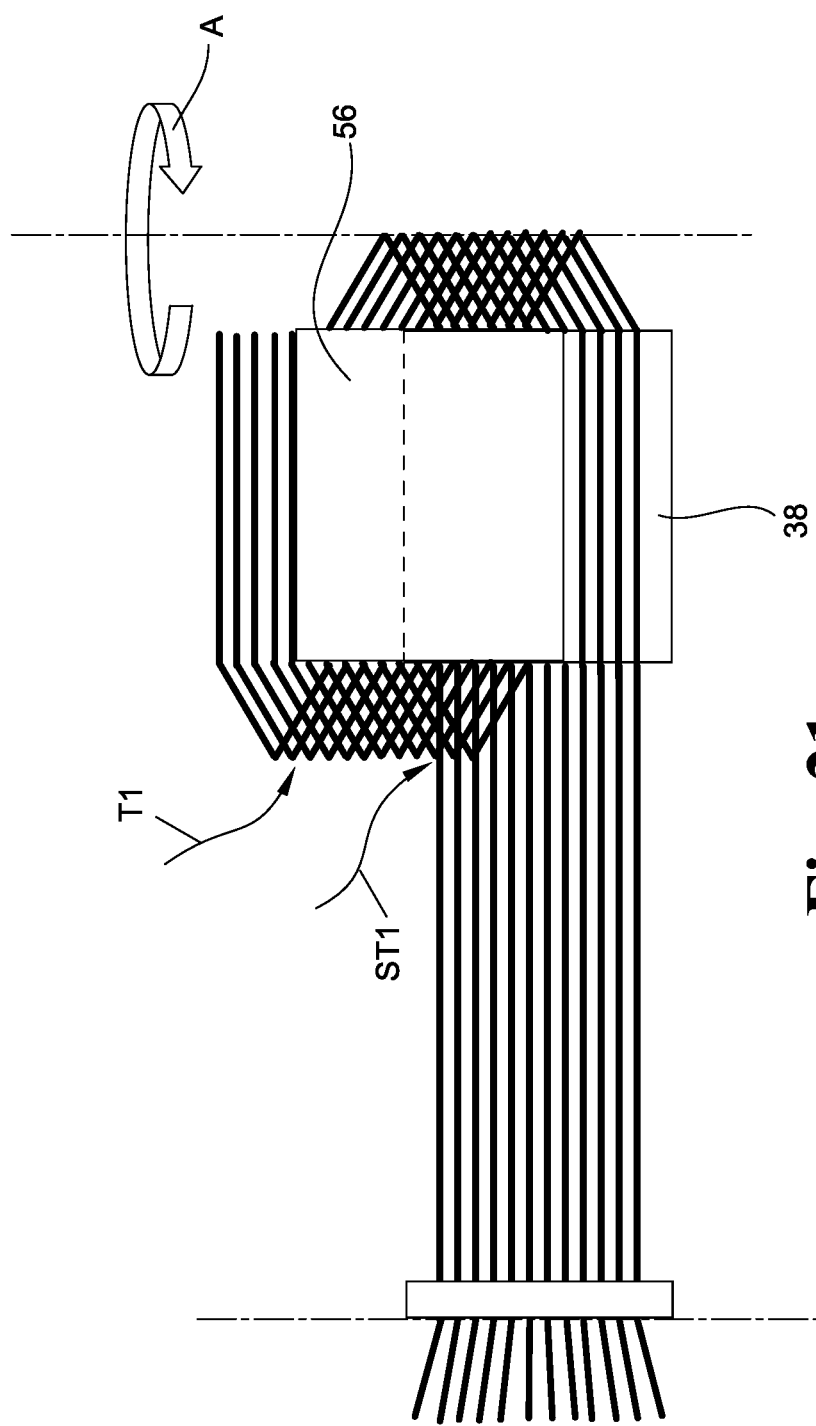

FIG. 21 is a successive stage after a second rotation around a second inclined portion. The portion of the coil assembly formed in FIG. 21 is like that of FIG. 14. FIG. 21 show that portion T1 of the formed coil portion bears on straight portion ST1 of group of conductors 12. This will maintain portion T1 above plane P and with a certain incline.

Portion T1 can be repositioned in plane P after a successive series of steps which form the next extra portion of the coil assembly. In this situation, portion T1 will have been shifted to an area, where portion T1 is no longer bearing on group of conductors 12. In this condition of portion T1, portion T1 can be pressed to return it into plane P.

The foregoing description exemplary embodiments of the invention will so fully reveal the invention according to the conceptual point of view, so that others, by applying current knowledge, will be able to modify and/or adapt for various applications such embodiment without further research and without parting from the invention, and, accordingly, it is therefore to be understood that such adaptations and modifications will have to be considered as equivalent to the specific embodiments. The means and the materials to realise the different functions described herein could have a different nature without, for this reason, departing from the field of the invention. It is to be understood that the phraseology or terminology that is employed herein is for the purpose of description and not of limitation.

The invention claimed is:

1. A method for forming a woven coil assembly, the coil assembly having adjacent superimposed linear portions extending parallel to each other in a first area of the coil assembly, and adjacent superimposed linear portions extending parallel to each other in a second area of the coil assembly, wherein a plurality of head portions connect the linear portions of the first area to the linear portions of the second area, the method comprising:

feeding a plurality of conductors for a predetermined length in a feeding direction parallel to each other and substantially parallel to a plane;

bending a first portion of the length of the plurality of conductors according to a predetermined orientation such that the plurality of conductors of the first portion are parallel to each other, oriented according to an angle of orientation, and positioned in the feeding direction downstream of a second portion of the length of the plurality of conductors that have not been bent;

bending a third portion of the length of the plurality of conductors according to the predetermined orientation such that the plurality of conductors of the third portion are parallel to each other, oriented according to the angle of orientation, and positioned in the feeding direction downstream of a fourth portion of the length of the plurality of conductors that have not been bent, the fourth portion positioned in the feeding direction upstream of the first portion; and prior to bending a further portion according to the predetermined orientation of the length of the plurality of conductors, rotating a portion of the first portion about an axis positioned substantially midway along the first portion and perpendicular to the feeding direction such that the rotated portion of the first portion of conductors are parallel to each other in a direction opposite to the feeding direction.

2. The method of claim 1, further comprising rotating a portion of the third portion about an axis positioned substantially midway along the third portion and perpendicular to the feeding direction such that the third portion of conductors are parallel to each other in a direction opposite to the feeding direction.

3. The method of claim 2, further comprising bending a fourth portion of the length of the plurality of conductors according to a predetermined orientation.

4. The method of claim 3, wherein the steps of claims 1 to 3 are repeated a predetermined number of times to form a corresponding number of first areas and second areas to complete the coil assembly.

5. A method for forming a woven coil assembly, the coil assembly having adjacent superimposed linear portions extending parallel to each other in a first area of the coil assembly, and adjacent superimposed linear portions extending parallel to each other in a second area of the coil assembly, wherein a plurality of head portions connect the linear portions of the first area to the linear portions of the second area, the method comprising performing:

a first step of feeding a plurality of conductors for a predetermined length in a feeding direction parallel to each other and substantially parallel to a plane;

a second step of bending a first portion of the length of the plurality of conductors according to a predetermined orientation, the plurality of conductors of the first portion after bending being parallel to each other, oriented according to an angle of orientation, and positioned in the feeding direction downstream of a second portion of the length of the plurality of conductors that have not been bent;

a third step of rotating a portion of the first portion about an axis positioned substantially midway along the first portion and perpendicular to the feeding direction, the rotating positioning the rotated portion of the first portion of conductors parallel to each other in a direction opposite to the feeding direction;

a fourth step of feeding the plurality of conductors for a predetermined length in a feeding direction parallel to each other and substantially parallel to a plane;

a fifth step of bending a third portion of the length of the plurality of conductors according to a predetermined orientation, the plurality of conductors of the third portion after bending being parallel to each other, oriented according to an angle of orientation, and positioned in the feeding direction downstream of a fourth portion of the length of the plurality of conductors that have not been bent; and a sixth step of rotating a portion of the third portion about the axis positioned substantially midway along the third portion and perpendicular to the feeding direction, the rotating positioning the rotated portion of the third portion of conductors parallel to each other in a direction opposite to the feeding direction.

6. The method of claim 5, wherein the steps of claim 5 are repeated a predetermined number of times to form a corresponding number of first areas and second areas to complete the coil assembly.

7. The method of claim 5, wherein portions of the turns are repositioned in the plane.

* * * * *